United States Patent
Oda et al.

(10) Patent No.: US 9,890,438 B2
(45) Date of Patent: Feb. 13, 2018

(54) ALUMINUM COPPER CLAD MATERIAL

(71) Applicant: Hitachi Metals, Ltd., Minato-ku, Tokyo (JP)

(72) Inventors: Yoshimitsu Oda, Suita (JP); Masaaki Ishio, Osaka (JP); Akio Hashimoto, Nerima-ku (JP); Kenji Ikeuchi, Kyoto (JP)

(73) Assignee: Hitachi Metals, Ltd., Tokyo (JP)

( * ) Notice: Subject to any disclaimer, the term of this patent is extended or adjusted under 35 U.S.C. 154(b) by 118 days.

(21) Appl. No.: 14/991,255

(22) Filed: Jan. 8, 2016

(65) Prior Publication Data

US 2016/0122842 A1 May 5, 2016

Related U.S. Application Data

(62) Division of application No. 13/701,677, filed as application No. PCT/JP2011/062651 on Jun. 2, 2011, now Pat. No. 9,266,188.

(30) Foreign Application Priority Data

Jun. 8, 2010 (JP) .................................. 2010-130699

(51) Int. Cl.
*B23K 20/02* (2006.01)
*C21D 9/00* (2006.01)
(Continued)

(52) U.S. Cl.
CPC ............ *C21D 9/0068* (2013.01); *B23K 20/02* (2013.01); *B32B 15/017* (2013.01); *C21D 1/26* (2013.01);
(Continued)

(58) Field of Classification Search
None
See application file for complete search history.

(56) References Cited

U.S. PATENT DOCUMENTS 3,496,625 A * 2/1970 Winter .................. B23K 20/04
428/611
3,800,405 A * 4/1974 Ziemek .............. B23K 20/2333
228/126

(Continued)

FOREIGN PATENT DOCUMENTS

JP 2001252772 A * 9/2001 ......... H01L 23/3672

OTHER PUBLICATIONS

Oda et al., "Aluminum Copper Clad Material", U.S. Appl. No. 13/701,677, filed Dec. 3, 2012.

*Primary Examiner* — Devang R Patel
(74) *Attorney, Agent, or Firm* — Keating & Bennett, LLP

(57) ABSTRACT

An aluminum copper clad material has excellent bonding strength and includes an aluminum layer and a copper layer that are bonded without a nickel layer interposed therebetween. The aluminum layer and the copper layer are diffusion-bonded via an Al—Cu intermetallic compound layer. The copper layer satisfies $Dcs \leq 0.5 \times Dcc$, where $Dcc$ represents the average crystal grain size of crystal grains in a central portion in the thickness direction of the copper layer, and $Dcs$ represents the average crystal grain size of an interface adjacent portion C2 in the copper layer that is about 0.5 μm apart from the interface between the copper layer and the intermetallic compound layer. The intermetallic compound layer has an average thickness of about 0.5 μm to about 10 μm.

8 Claims, 2 Drawing Sheets

(51) Int. Cl.
*C22C 9/00* (2006.01)
*C22C 21/00* (2006.01)
*B32B 15/00* (2006.01)
*B32B 15/01* (2006.01)
*C21D 1/26* (2006.01)
*C22C 9/04* (2006.01)
*C22C 21/08* (2006.01)
*C22C 21/10* (2006.01)
*C22C 21/14* (2006.01)
*C22C 21/16* (2006.01)
*C22C 21/18* (2006.01)
*C22F 1/04* (2006.01)
*C22F 1/047* (2006.01)
*C22F 1/053* (2006.01)
*C22F 1/057* (2006.01)
*C22F 1/08* (2006.01)

(52) U.S. Cl.
CPC ............... *C22C 9/00* (2013.01); *C22C 9/04* (2013.01); *C22C 21/00* (2013.01); *C22C 21/08* (2013.01); *C22C 21/10* (2013.01); *C22C 21/14* (2013.01); *C22C 21/16* (2013.01); *C22C 21/18* (2013.01); *C22F 1/04* (2013.01); *C22F 1/047* (2013.01); *C22F 1/053* (2013.01); *C22F 1/057* (2013.01); *C22F 1/08* (2013.01); *Y10T 428/1275* (2015.01)

(56) References Cited

U.S. PATENT DOCUMENTS

| | | | | |
|---|---|---|---|---|
| 4,429,022 A | * | 1/1984 | Breedis | B23K 20/233 148/536 |
| 4,500,028 A | * | 2/1985 | Breedis | B23K 20/233 228/117 |
| 6,178,623 B1 | * | 1/2001 | Kitazawa | C25D 5/10 156/47 |
| 2011/0206943 A1 | * | 8/2011 | Willis | B23K 20/021 428/609 |
| 2012/0058360 A1 | * | 3/2012 | Oda | B23K 20/02 428/600 |

* cited by examiner

ALUMINUM COPPER CLAD MATERIAL

BACKGROUND OF THE INVENTION

1. Field of the Invention

The present invention relates to an aluminum copper clad material in which an aluminum layer and a copper layer are diffusion-bonded.

2. Description of the Related Art

In lithium ion batterypacks for use in hybridvehicles andvarious electronic devices, lithium ion batteries are connected in series as necessary, and groups of batteries connected in series are further connected in parallel. Accordingly, a large number of wiring materials for connecting the groups of batteries are used. In lithium ion batteries, the positive electrode terminal is made of an aluminum material and the negative electrode terminal is made of a copper material. Therefore, for a wiring material used for series connection, an aluminum copper clad material in which an aluminum material and a copper material are bonded is suitably used as a raw material thereof. That is, the aluminum layer of a wiring material (lead wire) made from the clad material is connected to the positive electrode terminal of one battery, and the copper layer thereof is connected to the negative electrode terminal of another battery. Such connection makes it possible to prevent electrical corrosion in electrode terminal areas, and makes it possible to easily bond the electrode terminal and the wiring material by resistance welding, ultrasonic welding, or the like.

Also, the aluminum copper clad material is suitably used as, in addition to a wiring material for battery connection, a raw material of a wiring material for a capacitor, an intermediate part for connection between a copper part that has a semiconductor element mounted thereon and an aluminum part such as a radiator and the like.

The aluminum copper clad material is usually produced by stacking an aluminum plate that serves as a source of an aluminum layer and a copper plate that serves as a source of a copper layer, pressure-welding the stacked materials through rolls, and diffusion-annealing the resulting pressure-welded material. For the aluminum plate and the copper plate, annealed materials are usually used for enhanced pressure-weldability. During the diffusion annealing, at the interface between the aluminum layer and the copper layer, a brittle intermetallic compound layer made of an Al—Cu intermetallic compound is inevitably generated. When the annealing temperature is 350° C. or greater, generation and growth of the intermetallic compound layer is significant, thus making it difficult to control the thickness of the intermetallic compound layer through adjustment of a retention time, and the bonding strength between the aluminum layer and the copper layer deteriorates. Therefore, conventionally, when an aluminum layer and a copper layer are directly bonded, diffusion annealing is carried out under annealing conditions of a low temperature of 300° C. or less and a retention time of a few hours.

However, as described above, an aluminum copper clad material in which an aluminum layer and a copper layer are diffusion-bonded by low-temperature diffusion annealing is problematic in that sufficient bonding strength is not obtained. Accordingly, JP S62-46278B and JP H11-156995A propose an aluminum copper clad material for which diffusion annealing can be carried out at high temperatures and that has good bonding strength between the aluminum layer and the copper layer. This clad plate has an aluminum layer and a copper layer that are integrally pressure-welded via a nickel layer and then diffusion-annealed. Copper and nickel as well as nickel and aluminum are unlikely to generate an intermetallic compound during diffusion annealing, and thus a pressure-welded material in which an aluminum layer, a nickel layer, and a copper layer are laminated can be diffusion-annealed at high temperatures, and also the bonding strength of the diffusion-annealed clad material is improved.

Regarding the aforementioned aluminum copper clad material provided with a nickel layer, good bonding strength between the aluminum layer and the copper layer is obtained when the retention time is adequate even if the diffusion-annealing temperature is as high as about 500° C. However, the aluminum copper clad material is problematic in that it is necessary to provide a nickel layer that was originally not necessary, and nickel has poorer electrical conductivity and thermal conductivity than aluminum and copper and is more costly.

SUMMARY OF THE INVENTION

Preferred embodiments of the present invention provide an aluminum copper clad material that can be diffusion-annealed at high temperatures and exhibits excellent bonding between an aluminum layer and a copper layer without providing a nickel layer, and also provide a production method therefor.

Regarding a clad material produced by directly pressure-welding an aluminum layer and a copper layer and then diffusion-bonding the layers at low temperatures, the inventors observed in detail under an electron microscope the structure of the interface portion between the aluminum layer and the copper layer to investigate why the bonding strength between the aluminum layer and the copper layer is not sufficient. As a result, the inventors discovered that even though a relatively thin intermetallic compound layer can be formed when diffusion annealing is carried out at low temperatures, an extremely thin aluminum oxide continuous film is present in the intermetallic compound layer along the bonding interface, and the aluminum layer and the copper layer easily separate along this continuous film. It was inferred that the aluminum oxide film results from aluminum oxide generated in producing the clad material by spontaneous oxidation of the surface of an aluminum plate used as a raw material of the aluminum layer. Based on these findings, the inventors conceived that bonding strength can be enhanced by breaking up and dispersing the aluminum oxide continuous film, and developed and achieved the preferred embodiments of the present invention.

An aluminum copper clad material according to a preferred embodiment of the present invention preferably includes an aluminum layer and a copper layer that are diffusion-bonded via an Al—Cu intermetallic compound layer, the copper layer satisfies Dcs≤0.5×Dcc and preferably Dcs≤0.4×Dcc, where Dcc represents the average crystal grain size of crystal grains in a central portion in the thickness direction of the copper layer, and Dcs represents the average crystal grain size of an interface adjacent portion in the copper layer that is about 0.5 μm apart from the interface between the copper layer and the intermetallic compound layer, and the intermetallic compound layer has an average thickness of about 0.5 μm to about 10 μm and preferably about 1.0 μm to about 5.0 μm, for example.

In place of the limitations on the average crystal grain size Dcs of the interface portion in the copper layer, it is possible that the aluminum layer satisfies Das≤0.5×Dac and preferably Das≤0.4×Dac, where Dac represents the average crystal grain size of crystal grains in a central portion in the thickness direction of the aluminum layer, and Das represents the average crystal grain size of an interface adjacent portion in the aluminum layer that is about 0.5 μm apart from the interface between the aluminum layer and the intermetallic compound layer.

According to the clad material of a preferred embodiment of the present invention, the intermetallic compound layer is set at a specific thickness that does not cause bonding strength to deteriorate. Moreover, the average crystal grain size Dcs of the interface adjacent portion in the copper layer is Dcs≤0.5×Dcc and preferably Dcs≤0.4×Dcc, or the average crystal grain size Das of the interface adjacent portion in the aluminum layer is Das≤0.5×Dac and preferably Das≤0.4×Dac. In other words, crystal grains in the interface portion between the copper layer and the intermetallic compound layer or between the aluminum layer and the intermetallic compound layer are finer in a specific ratio than crystal grains in the central portion of the copper layer or the aluminum layer. As a result, fine crystal grains present in the interface portion of the copper layer or the aluminum layer that have random crystal orientations make an Al—Cu intermetallic compound generated during diffusion annealing have fine crystal grains that also have random crystal orientations. Accordingly, an aluminum oxide continuous film present on the raw material surface of the aluminum layer is broken up and dispersed by the intermetallic compound that is fine and grows in random orientations. Therefore, separation resulting from the aluminum oxide continuous film is reduced and prevented, and bonding strength between the aluminum layer and the copper layer is enhanced. Also, during diffusion annealing, the intermetallic compound grows from fine crystal grains of the interface portion of the copper layer or the aluminum layer as its starting point, and thus diffusion of atoms contributing to generation of the intermetallic compound is suppressed to some extent. Accordingly, even when diffusion annealing is carried out at a high temperature of about 450° C. to about 550° C., for example, suitably controlling the retention time makes it possible to easily form an intermetallic compound layer having a specific thickness. Therefore, the annealing temperature during diffusion annealing is not limited to a low temperature.

Regarding the clad material, it is possible that the aluminum layer is made of pure aluminum or an aluminum alloy having an electric conductivity of about 10% IACS or greater, for example, and that the copper layer is made of pure copper or a copper alloy having an electric conductivity of about 10% IACS or greater, for example. Use of such an aluminum material and copper material enables the electric conductivity of the clad material to be favorable. Also, it is preferable that the aluminum layer and the copper layer each have a thickness of about 0.1 mm to about 2 mm, for example. Processing a clad material in which the aluminum layer and the copper layer each have such a thickness makes it possible to provide a versatile wiring material.

A method according to a preferred embodiment of the present invention for producing the foregoing aluminum copper clad material, includes the steps of preparing an aluminum plate that serves as a source of the aluminum layer and a copper plate that serves as a source of the copper layer; pressure-welding the aluminum plate and the copper plate that are stacked; and diffusion-annealing the resulting pressure-welded material. The copper plate satisfies Hc≥1.6×Hca and preferably Hc≥1.7×Hca, where Hc (Hv) represents the average surface hardness of the surface on the pressure-welded side of the copper plate, and Hca (Hv) represents the average surface hardness of a completely annealed material of the copper plate. The diffusion annealing is carried out at an annealing temperature T(° C.) preferably of about 150° C. to about 550° C. for an annealing time t(min) in a range satisfying the following expressions.

$$tmin \leq t \leq tmax$$

$$tmax = -1.03 \times T + 567$$

$$tmin = 0.5, \text{ when } -0.19 \times T + 86 < 0.5,$$

$$tmin = -0.19 \times T + 86, \text{ when } -0.19 \times T + 86 \geq 0.5$$

Regarding the conditions of the diffusion annealing, it is preferable that the annealing temperature T(° C.) is about 300° C. to about 550° C. and the annealing time t(min) is in a range satisfying the following expressions.

$$tmin \leq t \leq tmax$$

$$tmax = -0.90 \times T + 478$$

$$tmin = 1.0, \text{ when } -0.36 \times T + 168 < 1$$

$$tmin = -0.36 \times T + 168, \text{ when } -0.36 \times T + 168 \geq 1.0$$

In place of the limitations on the average surface hardness of the surface on the pressure-welded side of the copper plate, it is possible that the aluminum plate satisfies Ha≥1.6×Haa and preferably Ha≥1.7×Haa, where Ha (Hv) represents the average surface hardness of the surface on the pressure-welded side of the aluminum plate, and Haa (Hv) represents the average surface hardness of a completely annealed material of the aluminum plate.

According to this production method of the clad material, the hardness of the surface on the pressure-welded side of the copper plate or the aluminum plate preferably is Hc≥1.6×Hca or Ha≥1.6×Haa, and thus performing diffusion annealing under the aforementioned specific conditions makes it possible to generate fine crystal grains in the interface adjacent portion of the copper layer or the aluminum layer such that Dcs≤0.5×Dcc or Das≤0.5×Dac is satisfied, and to form an intermetallic compound layer having a thickness of about 0.5 μm to about 10 μm, for example.

Regarding the production method of the clad material, it is more preferable in terms of productivity that the annealing temperature T(° C.) is about 450° C. or greater and about 550° C. or less. Setting the annealing temperature at such a relatively high temperature makes it possible to shorten the annealing time and enhance productivity. Also, it is possible that the aluminum plate is made of pure aluminum or an aluminum alloy having an electric conductivity of about 10% IACS or greater, and the copperplate is made of pure copper or a copper alloy having an electric conductivity of about 10% IACS or greater, thus making it possible to produce a clad material having good electric conductivity.

As described above, in the aluminum copper clad material according to a preferred embodiment of the present invention, fine crystal grains are formed in the interface portion between the intermetallic compound layer and the copper layer or between the intermetallic compound layer and the aluminum layer such that a specific grain size ratio relative to the average crystal grain size of the central portion of the copper layer or the aluminum layer is satisfied. Accordingly, crystal grains that form the intermetallic compound layer during diffusion annealing also are fine and have random crystal orientations, and an aluminum oxide continuous film as found in a conventional intermetallic compound is broken up and dispersed, thus yielding excellent bonding strength. Also, according to the production method of a preferred embodiment of the present invention, it is possible to easily produce the aforementioned clad material over a broad diffusion annealing temperature range of about 150° C. to about 550° C., for example. Also, performing diffusion annealing at a high temperature of about 450° C. or greater makes it possible to achieve excellent productivity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
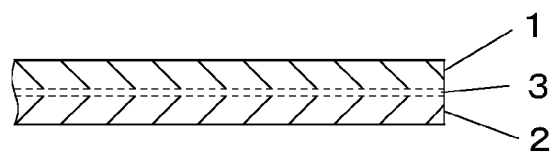
FIG. 1 is a partial cross-sectional explanatory diagram of an aluminum copper clad material according to a preferred embodiment of the present invention.

Below, a clad according to preferred embodiments of the present invention will now be described with reference to the drawings. As shown in FIG. 1, the clad material preferably includes an aluminum layer 1 and a copper layer 2 that are pressure-welded and diffusion bonded by undergoing diffusion annealing. Between the aluminum layer 1 and the copper layer 2, an intermetallic compound layer 3 made of an Al—Cu intermetallic compound containing Al and Cu as principal components that is formed during diffusion bonding is interposed. The intermetallic compound layer 3 preferably has an average thickness of about 0.5 μm to about 10 μm and preferably about 1.0 μm to about 5.0 μm, for example. The thickness of the clad material is determined as appropriate, and when the clad material is used as a raw material of an electrically conductive connecting material such as a wiring material, often the thicknesses of the aluminum layer 1 and the copper layer 2 are each set at about 0.1 mm to about 2 mm, and both layers are often set at the same thickness, for example.

The central portion in the thickness direction of the copper layer 2 is referred to as a copper layer central portion, and the portion spaced about 0.5 μm toward the copper layer side apart from the interface between the copper layer 2 and the intermetallic compound layer 3 is referred to as a copper layer interface adjacent portion. The central portion in the thickness direction of the aluminum layer 1 is referred to as an aluminum layer central portion, and the portion spaced about 0.5 μm toward the aluminum layer side apart from the interface between the aluminum layer 1 and the intermetallic compound layer 3 is referred to as an aluminum layer interface adjacent portion. Dcc represents the average crystal grain size in the copper layer central portion, and Dcs represents the average crystal grain size in the copper layer interface adjacent portion. Similarly, Dac represents the average crystal grain size in the aluminum layer central portion, and Das represents the average crystal grain size in the aluminum layer interface adjacent portion. The clad material according to one preferred embodiment satisfies Dcs≤0.5×Dcc and preferably Dcs≤0.4×Dcc, or the clad material may satisfy Das≤0.5×Dac and preferably Das≤0.4× Dac, for example. Moreover, both the aluminum layer 1 and the copper layer 2 may satisfy the aforementioned Das and Dcs of grain size requirements. Disposing the copper layer interface adjacent portion that is about 0.5 μm apart from the interface is to avoid the influence of the interface when measuring the crystal grain size. The average crystal grain size is obtained from the average of the equivalent circle diameters of crystal grains. The equivalent circle diameter refers to the diameter of a circle, assuming that a crystal grain has a circular grain boundary having the same area as that of a microscopically observed crystal grain.

Figure 2:
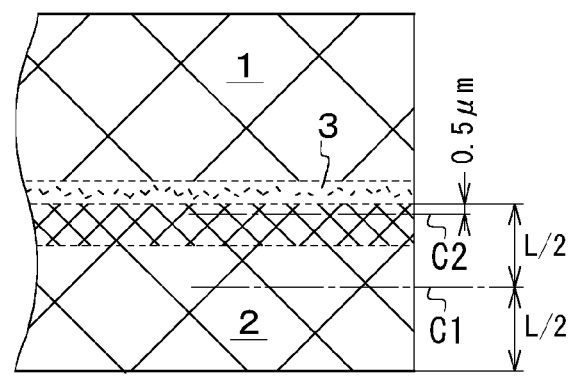
FIG. 2 is an enlarged partial cross-sectional explanatory diagram of the clad material according to a preferred embodiment of the present invention.

A manner of measuring the average crystal grain size will now be described below using the copper layer 2 as an example. An observation sample having a width of about 10 mm is collected from a clad material. As shown in FIG. 2, on each of a centerline (C1) of thickness L of the copper layer 2 and an interface adjacent line (C2) set at about 0.5 μm apart from the interface line between the copper layer 2 and the intermetallic compound layer 3, five observation sites are set at an equal interval in the width direction except on the edge portions. Then, an observation field of view over a width of about 10 μm is set so as to include the centerline C1, the grain size of a crystal grain having a grain boundary that intersects the centerline C1 is obtained as an equivalent circle diameter, and the average of the equivalent circle diameters of crystal grains included within the entire field of view is regarded as Dcc. Similarly, a field of view over a width of about 10 μm is set so as to include the interface adjacent line C2, the grain size of a crystal grain having a grain boundary that intersects the interface adjacent line C2 is obtained as an equivalent circle diameter, and the average of the equivalent circle diameters of crystal grains included within the entire field of view is regarded as Dcs. Also, the average thickness of the intermetallic compound layer 3, as in the measurement of the average crystal grain size, is the average of thicknesses measured at the five observation sites provided in the width direction except on the edge portions. The grain sizes (equivalent circle diameters) of crystal grains in the central portion and in the interface adjacent portion and the averages thereof can be obtained by subjecting an image observed under a transmission electron microscope (TEM) to image analysis using computer software.

Figure 3:
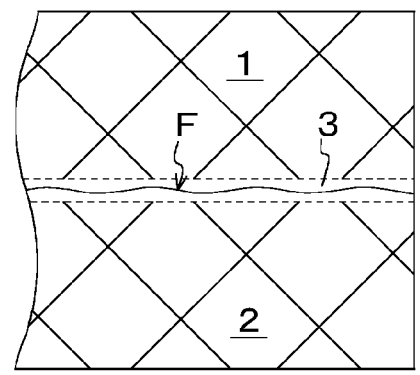
FIG. 3 is an enlarged partial cross-sectional explanatory diagram of an aluminum copper clad material in which no fine crystal grains are present in the interface portion of the copper layer.

The average crystal grain size Dcs of the copper layer interface adjacent portion preferably is, as stated above, set at Dcs≤0.5×Dcc and preferably Dcs≤0.4×Dcc, for example. That is, the grain size ratio Dcs/Dcc of the interface adjacent portion to the central portion preferably is about 0.5 or less and preferably about 0.4 or less, for example. This means that crystal grains that are finer than those of the central portion of the copper layer 2 are present in the interface adjacent portion of the copper layer 2 as well as at the interface. When fine crystal grains are present at the interface of the copper layer 2, crystal grains of the intermetallic compound layer generated during diffusion annealing at the boundary between the aluminum layer and the copper layer that are pressure-welded to each other are also fine and grow in random orientations . Accordingly, an aluminum oxide film present before diffusion annealing in the form of a continuous film at the interface of the aluminum layer due to spontaneous oxidation is broken up and dispersed. As a result, separation and breakage resulting from the aluminum oxide continuous film is reduced and prevented, and bonding strength is enhanced. For comparison, a cross-sectional schematic diagram showing a case where crystal grains in the interface portion of the copper layer 3 are not fine is presented in FIG. 3. In this case, because fine crystal grains are not present at the interface of the copper layer 2, an aluminum oxide continuous film F present in the intermetallic compound layer 3 remains without being broken up. Accordingly, the aluminum layer 1 and the copper layer 2 readily separate, and bonding strength deteriorates.

When the average crystal grain size Das of the aluminum layer interface adjacent portion is preferably set at Das≤0.5× Dac and preferably Das≤0.4×Dac also, crystal grains of the intermetallic compound layer 3 are fine and take random crystal orientations through the same mechanism as that described above, and thus bonding strength is enhanced.

The thickness of the intermetallic compound layer 3 also influences bonding strength. When the intermetallic compound layer 3 has a small thickness of less than about 0.5 μm, for example, growth of the intermetallic compound during diffusion annealing is insufficient, and division of the aluminum oxide continuous film is insufficient, thus resulting in deteriorated bonding strength. On the other hand, because the intermetallic compound is brittle when the thickness exceeds about 10μm, micro-cracks generated in the intermetallic compound layer are likely to become continuous cracks, also resulting in deteriorated bonding strength.

Therefore, the thickness of the intermetallic compound layer 3 is preferably set at about 0.5 μm to about 10 μm, preferably about 1.0 μm to about 7.5 pm, and more preferably about 1.0 μm to about 5.0 μm, for example.

As an aluminum material that forms the aluminum layer, it is possible to use, in addition to pure Al, an Al alloy containing Al in a proportion of about 50 mass % or greater. When the clad material is used as a conductive material, it is desirable to use pure Al or an Al alloy having an electric conductivity of about 10% IACS or greater and preferably about 20% IACS or greater as an aluminum material, for example. The unit "% IACS (International Annealed Copper Standard)" representing electric conductivity will be referred to below simply as "%". The electric conductivity (% IACS) of a material is calculated according to the expression given below. For example, pure Cu is 100% and pure Al is 65%.

Electric conductivity (% IACS)=(*A/B*)×100

A: Volume resistivity (1.7241 μΩ·cm) of standard annealed copper (pure copper)
B: Volume resistivity of a material The higher the Al content of an aluminum material, the higher the electric conductivity, and therefore, an aluminum material containing pure Al or an Al alloypreferably in aproportion of about 90 mass % (hereinafter simply appears to as "%") or greater and more preferably about 95% or greater is desirable as an aluminum material having good electric conductivity. Specific examples include aluminum materials A1050, A1060, A1070, A1080, A1100, A1200, A3003, A5005, A5052, A6063, and A6101 defined by JIS. For example, the A5005 alloy is an Al-(about 0 .5% to about 1 . 1%)Mn solid solution strengthened alloy having an electric conductivity of about 52%. Other examples of applicable Al alloys include Al-(about 4% to about 5%)Mg alloy (JIS A5082, an electric conductivity of about 29%), Al-(about 5% to about 6%)Cu alloy (JIS A2011, an electric conductivity of about 39%), Al-(about 3.5% to about 4.5%) Cu-(about 0.4% to about 1.0%)Mn-(about 0.2% to about 0.8%)Mg (JIS A2017, duralumin, an electric conductivity of about 50%), Al-(about 3.9% to about 5.0%)Cu-(about 0.5% to about 1.2%)Si-(about 0.40% to about 1.2%)Mn-(about 0.20% to about 0.8%)Mg (JIS A2014, an electric conductivity of about 50%), Al-(about 3.8% to about 4.9%)Cu-(about 0.3% to about 0.9%)Mn-(about 1.2% to about 1.8%) Mg (JIS A2024, super duralumin, an electric conductivity of about 30), and Al-(about 11% to about13.5%)Si-(about 0.8% to about 1.3%)Mg (JIS A4032, an electric conductivity of about 40% ).

Also, as a copper material that forms the copper layer 2, it is possible to use, in addition to pure Cu, a Cu alloy containing Cu in a proportion of about 50 mass % or greater. When the clad material is used as a conductive material, pure Cu such as oxygen-free copper, tough-pitch copper or phosphorous-deoxidized copper, or a Cu alloy having an electric conductivity of about 10% or greater and preferably about 20% or greater, for example, is preferable as a copper material. The higher the Cu content, the higher the electric conductivity, and therefore, a Cu alloy containing Cu in a proportion of preferably about 90% or greater and more preferably about 95% or greater is desirable as the Cu alloy. Examples of such Cu alloys include not only Cu alloys C1020, C1100, C1201, and C14500 stipulated by JIS but also Cu—Be alloys and Cu—Cr alloys that comply with JIS 23234 (for copper alloy electrode material). Examples of other usable Cu alloys include Cu-2% Ni alloy (an electric conductivity of about 33%) , Cu-6% Ni alloy (an electric conductivity of about 17%) , Cu-9.5% Ni alloy (an electric conductivity of about 11% ), Cu-30% Zn alloy (an electric conductivity of about 27.4%), Cu-34% Zn alloy (an electric conductivity of about 26.5%), Cu—Fe—P (Fe+P: about 0.13%) alloy (an electric conductivity of about 93%), Cu—Fe—P (Fe+P: about 2.48%) alloy (an electric conductivity of about 69%), and Cu-0.2% Zr alloy (an electric conductivity of about 93%), for example.

Next, a non-limiting example of a production method for manufacturing the clad material will now be described. First, an aluminum plate that serves as a source of the aluminum layer 1 and a copper plate that serves as a source of the copper layer 2 are provided (this step is referred to as a preparation step) . Next, the provided aluminum plate and copper plate are stacked, and the stacked materials are pressure-welded between rolls (this step is called a pressure welding step). Preferably, pressure welding is carried out by performing rolling just once, and the rolling reduction is about 45% to about 70% and preferably about 50% to about 60%, for example. After pressure welding, the pressure-welded material is diffusion-annealed (this step is referred to as a diffusion annealing step).

To make crystal grains of the interface portion on the bonded side of the copper layer 2 of the clad material finer than those of the central portion, the surface hardness of the surface on the pressure-welded side of the copper plate provided in the preparation step is increased. That is, the copper plate is preferably set at Hc≥1.6×Hca, preferably Hc≥1.7×Hca, and more preferably Hc≥1.8×Hca, for example, where the average surface hardness of the surface on the bonded side of the copper plate is Hc (Hv) and the average surface hardness of a completely annealed material of the copper plate is Hca (Hv). When Hc is less than about 1.6×Hca, crystal grains in the interface portion on the bonded side are not sufficiently fine, and as a result, it is difficult to attain fine crystal grains of the intermetallic compound layer during diffusion annealing, resulting in a clad material with impaired bonding strength.

The completely annealedmaterial is in a state in which processing strain introduced to the material has completely disappeared due to recrystallization. Complete annealing is achieved by, for example, an annealing temperature that is about ¾ of the melting point (a temperature at which the liquid phase occurs) of the copper material used and a retention time of about 3 minutes, for example. The reason the Hc is specified relative to the Hca of the completely annealed material is that the hardness of a matrix is different depending on the copper material that forms the copper plate, and thus the value of the surface hardness to be secured is also different. Specifically, when the material of the copper plate is pure Cu (Cu≥99.9%), the average surface hardness of the copper plate completely annealed at about 812° C. for approximately 3 min is about 37 Hv, and therefore, the average surface hardness Hc of the copper plate may be set at about 59 Hv or greater, preferably about 63 Hv or greater, and more preferably about 67 Hv or greater. The value of Hc is a value obtained by rounding off the calculated value of the right-hand side of the foregoing inequality to the nearest whole number.

Also, when crystal grains of the interface portion on the bonded side of the aluminum layer 1 of the clad material are made finer than crystal grains of the central portion, as with the case where crystal grains of the interface portion on the bonded side of the copper layer are made fine, the aluminum plate is preferably set at Ha≥1.6×Haa, preferably Ha≥1.7×Haa, and more preferably Hc≥1.8×Hca, for example, where Ha (Hv) is the average surface hardness of the surface on the bonded side of the aluminum plate, and Haa (Hv) is the average surface hardness of the completely annealed material of the aluminum plate. Specifically, when the material of the aluminum plate is pure Al (Al≥99.5%), the average surface hardness of the aluminum plate completely annealed at about 495° C. for approximately 3 min is about 20 Hv, and therefore, the average surface hardness Ha of the aluminum plate may be set at about 32 Hv or greater, preferably about 34 Hv or greater, and more preferably about 36 Hv or greater, for example.

Hardening the surfaces on the bonded side of the copper plate and the aluminum plate is easily carried out usually by rolling the materials, and in addition, a surface hardening-method such as shot peening is applicable. The upper limits to the average surface hardnesses Hc and Ha of the surfaces on the pressure-welded side of the copper plate and the aluminum plate are not particularly specified, and when surface hardening is carried out by rolling, usually, the upper limits will be about four times the average surface hardnesses of the completely annealed materials.

The annealing temperature of the diffusion annealing preferably is about 150° C. to about 550° C., for example. At a temperature lower than about 150° C., generation and growth of the intermetallic compound layer significantly deteriorate, thus failing to yield an intermetallic compound layer having a necessary thickness. In contrast, at a temperature exceeding about 550° C., growth of the intermetallic compound is significant, thus making it difficult to control its thickness, and also failing to yield an intermetallic compound layer having a specific thickness. Also, crystal grains in the interface portion on the bonded side are likely to be coarse. The annealing temperature is preferably about 300° C. to about 550° C. and more preferably about 450° C. to about 550° C., for example. An annealing temperature of about 450° C. to about 550° C., for example, yields an intermetallic compound layer having a specific thickness in a short period of time, and results in excellent productivity.

The retention time t(min) at the foregoing annealing temperature (T ° C.) is given according to the following expressions. These expressions are obtained as a result of pressure-welded materials in which an aluminum plate and a copper plate are pressure-welded being diffusion-annealed at annealing temperatures of about 150° C. to about 550° C. for various retention times (annealing times) and examining the thicknesses of the resulting intermetallic compound layers. With a retention time shorter than tmin, the thickness of the intermetallic compound layer is insufficient. In contrast, with a retention time longer than tmax, the thickness of the intermetallic compound layer is excessive, and coarse crystal grains are generated.

tmin≤t≤tmax $t$max=−1.03×$T$+567 when −0.19×$T$+86<0.5, $t$min=0.5 when −0.19×$T$+86≥0.5, $t$min=−0.19×$T$+86

Moreover, it is preferable that tmax and tmin are set such that the following expressions are satisfied. In this case, it is desirable that the annealing temperature is preferably about 300° C. to about 550° C. and more preferably about 450° C. to about 550° C., for example.

$t$max=−0.90×$T$+478 when −0.36×$T$+168<1, $t$min=1.0 when −0.36×$T$+168≥1.0, $t$min=−0.36×$T$+168

Below, the clad material according to a preferred embodiment of the present invention shall be described in detail by way of non-limiting examples, but the present invention should not be construed as being limited to any of the examples described herein.

EXAMPLES

Aluminum plates and copper plates shown in Table 1 were provided as raw plates, and each plate was completely annealed by being retained for 3 minutes at a temperature of about ¾ of its melting point. Some of the completely annealed aluminum plates and copper plates were subjected to cold rolling at a rolling reduction of about 10% to about 70% to variously set the average surface hardnesses of the surfaces on the pressure-welded side of these plates. Then, aluminum plates and copper plates as annealed or after being rolled were stacked and then pressure-welded through rolls, thus yielding pressure-welded materials having a plate thickness of about 2.0 mm. The aluminum plates and copper plates before being pressure-welded each had a thickness of about 2.0 mm and a plate width of about 50 mm, and thus the rolling reduction during pressure welding was about 50%.

For each clad material sample, the materials of the raw plates (aluminum plates and copper plates) and the average surface hardnesses on the pressure-welded side of the raw plates before being pressure-welded are shown in Table 1. In Table 1, the average surface hardnesses provided with an asterisk "*" indicate that the surface was hardened by cold rolling on a completely annealed material. The average surface hardness is an average of surface hardnesses measured at five measurement sites provided at an equal interval in the plate width direction except on the edge portions. The test load for measuring the surface hardness (Vickers hardness) was 300 g.

The reference signs (numbers) of the aluminum materials of the raw plate shown in Table 1 are material notations stipulated by JIS . "A1050" indicates pure Al (Al: 99.50 mass %), "A3003" indicates a corrosion-resistant aluminum alloy (Al: 96.75 mass %), "A5052" indicates a corrosion-resistant aluminum alloy (Al: 95.75 mass %), and "A2014" indicates a high-strength aluminum alloy (Al: 90.25 mass %). Regarding copper material notations, "OFC" indicates oxygen-free copper, "TPC" indicates tough-pitch copper, and "PDC" indicates phosphorous-deoxidized copper, and brass had a Zn content of 30%.

Figure 4:
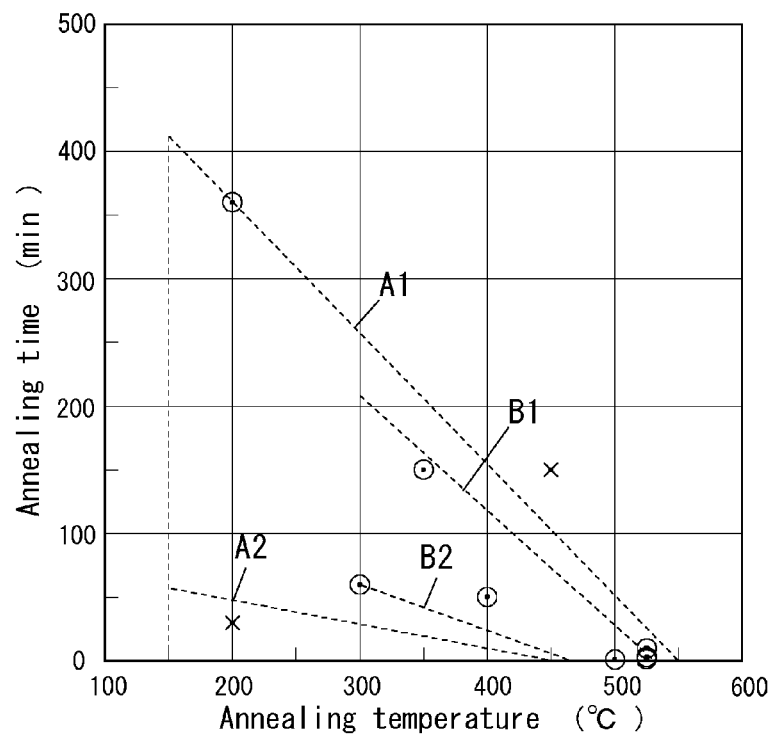
FIG. 4 is a graph showing a relationship between the annealing temperature and the annealing time (retention time) in examples.

Next, diffusion annealing was performed on the pressure-welded materials under the conditions shown in Table 1, thus giving clad materials. Annealing conditions are shown in the graph of FIG. 4. In FIG. 4, "○" indicates examples that satisfy the requirements of the invention, and "×" indicates examples that do not satisfy of the requirements of a preferred embodiment of the present invention. Also, FIG. 4 depicts lines indicating an upper-limit expression A1, a lower-limit expression A2 (provided that t≥0.5), a preferable upper-limit expression B1, and a preferable lower-limit expression B2 (provided that t≥1.0) for the annealing time t(min) where the annealing temperature T(° C.) is a variable.

$$A1 = -1.03 \times T + 567$$

$$A2 = -0.19 \times T + 86$$

$$B1 = -0.90 \times T + 478$$

$$B2 = -0.36 \times T + 168$$

After diffusion annealing, a test piece having a length of about 50 mm along the rolling direction and a width of about 10 mm was collected from each clad material sample. The cross-section of each test piece was observed under a transmission electron microscope (TEM), the observed image was subjected to image analysis to obtain, according to the manner of measurement described above, the average thickness of the intermetallic compound layer, the average crystal grain sizes in the central portions of the aluminum layer and the copper layer (Dac, Dcc), the average crystal grain sizes in the interface adjacent portions of the aluminum layer and the copper layer (Das, Dcs), and the ratios of the average crystal grain sizes of the interface adjacent portions to the central portions (Das/Dac, Dcs/Dcc). These measurement results are also shown in Table 1.

Figure 5:
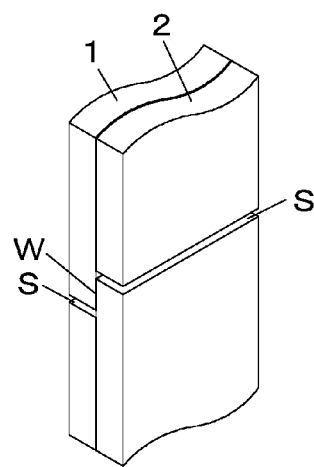
FIG. 5 is a perspective diagram of a principal portion of a tensile test piece of a clad material.

Moreover, using the test piece collected from each sample, as shown in FIG. 5, a tensile test piece provided with slits S each having a width of about 0.25 mm in the central portions in the length direction of the aluminum layer 1 and the copper layer 2 was prepared such that the length of a laminated portion W where both layers are bonded was about 1 mm. The tensile test piece was stretched at a rate of about 1 mm/min until the test piece broke in order to investigate the bonding strength per centimeter of width and the breakage site. These results are also shown in Table 1. In Table 1, the "separation" in the column of breakage mode means that the test piece broke due to separation at the bonding interface portion of the laminated portion W, and "Al breakage" means that the breakage occurred at the slit part of the aluminum layer.

As can be understood from Table 1, although samples 0 and 1 in which the surfaces on the pressure-welded side of the aluminum plate and the copper plate were not hardened both satisfied the thickness requirements of a preferred embodiment of the present invention for the intermetallic compound layer, the crystal grains in the interface portion on the bonded side were not fine, and Das/Dac and Dcs/Dcc were large, exceeding about 0.5, and therefore bonding strength was insufficient, and the aluminum layer and the copper layer were separated at the bonding interface portion. In fact, it was confirmed with a TEM observation image that in these clad materials, a very thin aluminum oxide continuous film remained in the intermetallic compound layer.

Also, although in sample 2 the surface on the pressure-welded side of the aluminum plate was hardened, the extent of hardening was too small, and thus the ratio Das/Dac was large, exceeding about 0.5. Therefore, good bonding was not attained, and separation occurred at the bonding interface portion. Similarly, because hardening of the surface on the pressure-welded side of the copper plate was too little, sample 5 also demonstrated deteriorated bonding strength and separation occurred at the interface portion. Also, although in samples 16 and 17 the surface on the pressure-welded side of the copper plate was sufficiently hardened, diffusion annealing conditions were inadequate, and the thickness of the intermetallic compound layer was either too small or too large, resulting in breakage occurring at the bonding interface portion.

In contrast, in the clad materials of the examples according to various preferred embodiments of the present invention, the thicknesses of the intermetallic compound layer were all in the range of about 0.5 μm to about 10 μm, and either Das/Dac or Dcs/Dcc or both Das/Dac and Dcs/Dcc were about 0.5 or less, and therefore the bonding strength was about 392 N/cm or greater, resulting in all breakages occurring in the aluminum layer, and separation not occurring at the bonding interface portion.

TABLE 1

| Sample No. | Materials of raw plates | | Raw plate Average surface hardnesses (Hv) | | Annealing conditions | | Intermetallic compound layer |
|---|---|---|---|---|---|---|---|
| | Al plate | Copper plate | Ha | Hc | Temp. (° C.) | Time (min) | Thickness (μm) |
| *0 | A1050 | OFC | 20 | 37 | 200 | 360 | 0.6 |
| *1 | " | " | 20 | 37 | 525 | 1 | 1.2 |
| *2 | " | " | *29 | 37 | 525 | 1 | 1.3 |
| 3 | " | " | *35 | 37 | 525 | 1 | 1.3 |
| 4 | " | " | *41 | 37 | 525 | 1 | 1.4 |
| *5 | " | " | 20 | *50 | 525 | 1 | 1.4 |
| 6 | " | " | 20 | *65 | 525 | 1 | 1.3 |
| 7 | " | " | 20 | *90 | 525 | 1 | 1.5 |
| 8 | " | " | 20 | *118 | 525 | 1 | 1.4 |
| 9 | " | " | 20 | *118 | 200 | 360 | 0.5 |

TABLE 1-continued

| | | | | | | | |
|---|---|---|---|---|---|---|---|
| 10 | " | " | 20 | *118 | 300 | 60 | 1.4 |
| 11 | " | " | 20 | *118 | 500 | 1 | 1.0 |
| 12 | " | " | 20 | *118 | 525 | 3 | 3.6 |
| 13 | " | " | 20 | *118 | 525 | 10 | 9.8 |
| 14 | " | " | 20 | *118 | 350 | 150 | 4.5 |
| 15 | " | " | 20 | *118 | 400 | 50 | 3.5 |
| *16 | " | " | 20 | *118 | 200 | 30 | 0.3 |
| *17 | " | " | 20 | *118 | 450 | 150 | 12.1 |
| 18 | " | " | *40 | *118 | 525 | 1 | 1.4 |
| 19 | A2014 | " | 46 | *118 | 525 | 1 | 1.5 |
| 20 | A3003 | " | 29 | *118 | 525 | 1 | 1.3 |
| 21 | A5052 | " | 48 | *118 | 525 | 1 | 1.5 |
| 22 | A1050 | TPC | 20 | *115 | 525 | 1 | 1.4 |
| 23 | A1050 | PDC | 20 | *114 | 525 | 1 | 1.5 |
| 24 | A1050 | Brass | 20 | *151 | 525 | 1 | 1.6 |

| Sample No. | Layer central portion Average crystal grain sizes (μm) | | Layer surface adjacent portion Average crystal grain sizes (μm) | | Crystal grain size ratios | | Bonding strength (N/cm) | Breakage mode |
|---|---|---|---|---|---|---|---|---|
| | Dac | Dcc | Das | Dcs | Das/Dac | Dcs/Dcc | | |
| *0 | 22 | 22 | 20 | 20 | 0.91 | 0.91 | 294 | Separation |
| *1 | 22 | 40 | 20 | 37 | 0.91 | 0.93 | 343 | Separation |
| *2 | 27 | 40 | 20 | 37 | 0.74 | 0.93 | 363 | Separation |
| 3 | 27 | 40 | 13 | 37 | 0.48 | 0.93 | 392 | Al breakage |
| 4 | 32 | 40 | 12 | 37 | 0.38 | 0.93 | 412 | Al breakage |
| *5 | 22 | 40 | 20 | 33 | 0.91 | 0.83 | 382 | Separation |
| 6 | 22 | 35 | 20 | 17 | 0.91 | 0.49 | 411 | Al breakage |
| 7 | 27 | 35 | 25 | 15 | 0.93 | 0.43 | 441 | Al breakage |
| 8 | 32 | 35 | 29 | 7 | 0.91 | 0.20 | 529 | Al breakage |
| 9 | 32 | 22 | 27 | 9 | 0.84 | 0.41 | 578 | Al breakage |
| 10 | 27 | 25 | 23 | 8 | 0.85 | 0.32 | 500 | Al breakage |
| 11 | 22 | 35 | 20 | 13 | 0.91 | 0.37 | 588 | Al breakage |
| 12 | 27 | 45 | 25 | 9 | 0.93 | 0.20 | 480 | Al breakage |
| 13 | 32 | 60 | 26 | 19 | 0.81 | 0.32 | 461 | Al breakage |
| 14 | 22 | 35 | 20 | 12 | 0.91 | 0.34 | 480 | Al breakage |
| 15 | 27 | 38 | 24 | 15 | 0.89 | 0.39 | 470 | Al breakage |
| *16 | 20 | 20 | 18 | 14 | 0.90 | 0.70 | 284 | Separation |
| *17 | 27 | 35 | 20 | 23 | 0.74 | 0.66 | 245 | Separation |
| 18 | 27 | 45 | 12 | 7 | 0.44 | 0.16 | 578 | Al breakage |
| 19 | 20 | 38 | 14 | 12 | 0.70 | 0.32 | 627 | Al breakage |
| 20 | 19 | 35 | 13 | 8 | 0.68 | 0.23 | 725 | Al breakage |
| 21 | 16 | 35 | 11 | 13 | 0.69 | 0.37 | 1186 | Al breakage |
| 22 | 22 | 40 | 17 | 9 | 0.77 | 0.23 | 500 | Al breakage |
| 23 | 20 | 38 | 16 | 9 | 0.80 | 0.24 | 500 | Al breakage |
| 24 | 19 | 32 | 15 | 5 | 0.79 | 0.16 | 539 | Al breakage |

Note:
Asterisked samples nos. are comparative examples, and others are inventive examples.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method for producing an aluminum copper clad material in which an aluminum layer and a copper layer are diffusion-bonded via an Al—Cu intermetallic compound layer, the method comprising the steps of:
   preparing an aluminum plate that serves as a source of the aluminum layer and a copper plate that serves as a source of the copper layer, wherein the preparing step includes completely annealing the copper plate and subjecting it to cold rolling to set an average surface hardness which satisfies Hc>1.6×Hca, wherein Hc (Hv) represents an average surface hardness of a surface of the copper plate to be pressure-welded, and Hca (Hv) represents an average surface hardness of the completely annealed material of the copper plate;
   pressure-welding the aluminum plate and the copper plate that are stacked on each other; and
   diffusion-annealing the resulting pressure-welded material at an annealing temperature T (° C.) of about 150° C. to about 550° C. for an annealing time t (min) in a range satisfying the following expressions:

$tmin \leq t \leq tmax$ $tmax = -1.03 \times T + 567$ $tmin = 0.5$, when $-0.19 \times T + 86 < 0.5$, $tmin = -0.19 \times T + 86$, when $-0.19 \times T + 86 \geq 0.5$; wherein in the resulting aluminum copper clad material:
      the copper layer satisfies Dcs≤0.5×Dcc, where Dcc represents an average crystal grain size of crystal grains in a central portion in a thickness direction of the copper layer, and Dcs represents an average crystal grain size of an interface adjacent portion in the copper layer that is about 0.5 μm apart from an interface between the copper layer and the Al—Cu intermetallic compound layer; and
      the Al—Cu intermetallic compound layer has an average thickness of about 0.5 μm to about 10 μm and includes broken up and dispersed aluminum oxide.

2. A method for producing an aluminum copper clad material in which an aluminum layer and a copper layer are diffusion-bonded via an Al—Cu intermetallic compound layer, the method comprising the steps of:
   preparing an aluminum plate that serves as a source of the aluminum layer and a copper plate that serves as a source of the copper layer, wherein the preparing step includes completely annealing the aluminum plate and subjecting it to cold rolling to set an average surface hardness which satisfies Ha>1.6×Haa, where Ha (Hv) represents an average surface hardness of a surface of the aluminum plate to be pressure-welded, and Haa (Hv) represents an average surface hardness of the completely annealed material of the aluminum plate;
   pressure-welding the aluminum plate and the copper plate that are stacked on each other; and
   diffusion-annealing the resulting pressure-welded material at an annealing temperature T (° C.) of about 150° C. to about 550° C. for an annealing time t (min) in a range satisfying the following expressions:

$tmin \leq t \leq tmax$ $tmax = -1.03 \times T + 567$ $tmin = 0.5$, when $-0.19 \times T + 86 < 0.5$, $tmin = -0.19 \times T + 86$, when $-0.19 \times T + 86 \geq 0.5$; wherein in the resulting aluminum copper clad material:
      the aluminum layer satisfies Das≤0.5×Dac, where Dac represents an average crystal grain size of crystal grains in a central portion in a thickness direction of the aluminum layer, and Das represents an average crystal grain size of an interface adjacent portion in the aluminum layer that is about 0.5 μm apart from an interface between the aluminum layer and the intermetallic compound layer; and
      the intermetallic compound layer has an average thickness of about 0.5 μm to about 10 μm and includes broken up and dispersed aluminum oxide.

3. The method for producing the aluminum copper clad material according to claim 1, wherein the annealing temperature T (° C.) is about 300° C. to about 550° C. for the annealing time t (min) in a range satisfying the following expressions:

$tmin \leq t \leq tmax$ $tmax = -0.90 \times T + 478$ $tmin = 1.0$, when $-0.36 \times T + 168 < 1.0$ $tmin = -0.30 \times T + 168$, when $-0.36 \times T + 168 \geq 1.0$.

4. The method for producing the aluminum copper clad material according to claim 2, wherein the annealing temperature T (° C.) is about 300° C. to about 550° C. for the annealing time t (min) in a range satisfying the following expressions:

$tmin \leq t \leq tmax$ $tmax = -0.90 \times T + 478$ $tmin = 1.0$, when $-0.36 \times T + 168 < 1.0$ $tmin = -0.36 \times T + 168$, when $-0.36 \times T + 168 \geq 1.0$.

5. The method for producing the aluminum copper clad material according to claim 1, wherein the annealing temperature T (° C.) is about 450° C. or greater and about 550° C. or less.

6. The method for producing the aluminum copper clad material according to claim 2, wherein the annealing temperature T (° C.) is about 450° C. or greater and about 550° C. or less.

7. The method for producing the aluminum copper clad material according to claim 1, wherein the aluminum plate is made of pure aluminum or an aluminum alloy having an electric conductivity of about 10% IACS or greater, and the copper plate is made of pure copper or a copper alloy having an electric conductivity of about 10% IACS or greater.

8. The method for producing the aluminum copper clad material according to claim 2, wherein the aluminum plate is made of pure aluminum or an aluminum alloy having an electric conductivity of about 10% IACS or greater, and the copper plate is made of pure copper or a copper alloy having an electric conductivity of about 10% IACS or greater.

* * * * *